(12) United States Patent
Ko et al.

(10) Patent No.: US 11,973,623 B2
(45) Date of Patent: Apr. 30, 2024

(54) LATCH CIRCUIT AND EQUALIZER INCLUDING THE SAME

(71) Applicant: SAMSUNG ELECTRONICS CO., LTD., Suwon-si (KR)

(72) Inventors: Kyeongjoon Ko, Yongin-si (KR); Hanseok Kim, Seoul (KR); Jaehyun Park, Seoul (KR); Junhan Bae, Hwaseong-si (KR); Gyeongseok Song, Hwaseong-si (KR); Jongjae Ryu, Changwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/834,563

(22) Filed: Jun. 7, 2022

(65) Prior Publication Data

US 2022/0400035 A1 Dec. 15, 2022

(30) Foreign Application Priority Data

Jun. 11, 2021 (KR) .................. 10-2021-0076249
Dec. 6, 2021 (KR) .................. 10-2021-0173245

(51) Int. Cl.
*H04L 25/03* (2006.01)
*H04B 1/16* (2006.01)

(52) U.S. Cl.
CPC ......... *H04L 25/03057* (2013.01); *H04B 1/16* (2013.01); *H04L 25/03878* (2013.01); *H04L 2025/03445* (2013.01)

(58) Field of Classification Search
CPC ......... H04L 25/03057; H04L 25/03878; H04L 2025/03445; H04L 25/03146; H04B 1/16
See application file for complete search history.

(56) References Cited

U.S. PATENT DOCUMENTS

| | | | |
|---|---|---|---|
| 7,715,474 B2 | 5/2010 | Park et al. | |
| 8,477,833 B2 | 7/2013 | Bulzacchelli et al. | |
| 8,559,498 B1 | 10/2013 | Eliaz | |
| 9,577,848 B1 | 1/2017 | Chattopadhyay et al. | |
| 9,882,795 B1 | 1/2018 | Zhang et al. | |
| 10,187,234 B1 | 1/2019 | Shahramian et al. | |
| 10,848,353 B1 | 11/2020 | Dong et al. | |
| 10,892,918 B1 | 1/2021 | Eachempatti et al. | |
| 11,044,124 B1* | 6/2021 | Goyal | H04L 25/03146 |
| 2009/0252215 A1* | 10/2009 | Bulzacchelli | H04L 25/03019 375/233 |

(Continued)

FOREIGN PATENT DOCUMENTS

KR 10-1165547 B1 7/2012

*Primary Examiner* — Dac V Ha
(74) *Attorney, Agent, or Firm* — Sughrue Mion, PLLC (57) ABSTRACT

A latch circuit and an equalizer including the same are provided. The equalizer includes: an even data path configured to receive a reception data signal and including a first summing circuit and a first latch circuit; and an odd data path configured to receive the reception data signal and including a second summing circuit and a second latch circuit. An even data signal output from the first latch circuit is configured to be input to the second summing circuit, and an odd data signal output from the second latch circuit is configured to be input to the first summing circuit. Each of the first latch circuit and the second latch circuit includes a latch and a multiplexer.

15 Claims, 11 Drawing Sheets

(56) References Cited

U.S. PATENT DOCUMENTS

| | | | | |
|---|---|---|---|---|
| 2010/0054324 A1* | 3/2010 | Bulzacchelli | ..... | H04L 25/03057 375/233 |
| 2011/0096825 A1* | 4/2011 | Hollis | ............... | H04L 25/03057 375/233 |
| 2015/0016496 A1* | 1/2015 | Mukherjee | ........ | H04L 25/03878 375/233 |
| 2016/0226684 A1* | 8/2016 | Zhong | ..................... | H04L 27/01 |
| 2016/0359645 A1* | 12/2016 | Mukherjee | ............ | H04L 7/0045 |
| 2017/0373889 A1* | 12/2017 | Sakai | ..................... | H03K 3/037 |

* cited by examiner

LATCH CIRCUIT AND EQUALIZER INCLUDING THE SAME

CROSS-REFERENCE TO RELATED APPLICATIONS

This application claims priority to Korean Patent Applications Nos. 10-2021-0076249, filed on Jun. 11, 2021, and 10-2021-0173245, filed on Dec. 6, 2021, in the Korean Intellectual Property Office, the disclosures of which are incorporated by reference herein in their entireties.

BACKGROUND

The present disclosure relates to a latch circuit and an equalizer including the same.

Electronic devices transmit and receive electrical signals to and from other electronic devices through channels (for example, signal lines) to exchange information. In the signals transmitted and received between the electronic devices, signal distortion may occur due to response characteristics of the channels. To compensate for this signal distortion, equalizers of various structures are used.

SUMMARY

The present disclosure provides a latch circuit in which a delay time is reduced and an equalizer including the latch circuit and further provides an electronic device.

According to an aspect of an example embodiment, an equalizer includes: an even data path configured to receive a reception data signal and including a first summing circuit and a first latch circuit; and an odd data path configured to receive the reception data signal and including a second summing circuit and a second latch circuit. An even data signal output from the first latch circuit is configured to be input to the second summing circuit, and an odd data signal output from the second latch circuit is configured to be input to the first summing circuit. Each of the first latch circuit and the second latch circuit includes a latch and a multiplexer.

According to an aspect of an example embodiment, an equalizer includes an even data path configured to receive a reception data signal and generate an even data signal based on an even clock signal. The even data path includes: a first amplifier configured to amplify the reception data signal and output a first amplification signal; a first summing circuit configured to sum the first amplification signal and an odd data signal, and generate a first SA input signal; a first sense amplifier configured to generate a first SA output signal based on the first SA input signal; a first buffer configured to generate a first buffer output signal based on the first SA output signal; and a first latch circuit including a latch and a multiplexer, and configured to generate the even data signal based on the first buffer output signal.

According to an aspect of an example embodiment, a latch circuit includes: a latch configured to latch an input signal based on a clock signal and generate a latch signal; and a multiplexer configured to receive the input signal and the latch signal, and output one of the input signal and the latch signal as an output signal according to the clock signal.

BRIEF DESCRIPTION OF DRAWINGS

The above and other aspects will be more apparent from the following description of example embodiments, taken in conjunction with the accompanying drawings, in which.

DETAILED DESCRIPTION

Hereinafter, example embodiments are described with reference to the accompanying drawings.

Figure 1:
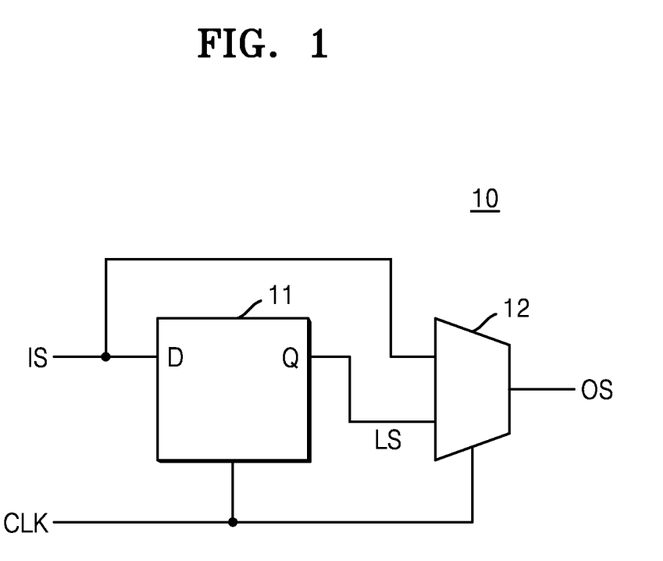
FIG. 1 is a circuit diagram of a latch circuit according to an example embodiment.
Figure 2:
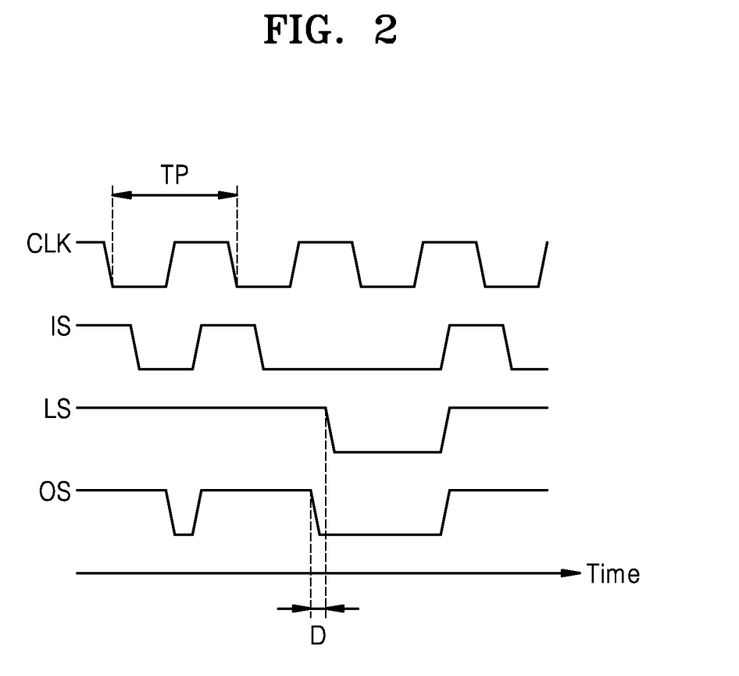
FIG. 2 is a timing diagram of an operation of the latch circuit according to an example embodiment.

FIG. 1 is a circuit diagram of a latch circuit 10 according to an example embodiment. FIG. 2 is a timing diagram of an operation of the latch circuit 10 according to an example embodiment.

Referring to FIG. 1, the latch circuit 10 may be configured to receive an input signal IS, which is a return to zero (RZ) signal, and to generate an output signal OS, which is a non-return to zero (NRZ) signal. The latch circuit 10 may include a latch unit 11 (i.e., a latch) and a multiplexer 12, each of which includes circuitry such as transistors, capacitors, logic gates, and other circuit elements to implement certain functionality described in more detail below.

The latch unit 11 may be configured to receive the input signal IS and a clock signal CLK. The latch unit 11 may be configured to latch the input signal IS based on the clock signal CLK and to generate a latch signal LS.

The multiplexer 12 may be configured to receive the input signal IS and the latch signal LS, and output the input signal IS or the latch signal LS according to the clock signal CLK. The clock signal CLK may oscillate between a first level state and a second level state according to a predetermined cycle.

For example, when the clock signal CLK is in the first level state, the multiplexer 12 may output the input signal IS as an output signal OS, and when the clock signal CLK is in the second level state, the multiplexer 12 may output the latch signal LS as the output signal OS. For example, when the input signal IS is a data signal, the multiplexer 12 may output the input signal IS as the output signal OS at a time point at which data is applied to the latch unit 11 and may output the latch signal LS as the output signal OS when the latch unit 11 maintains the data.

According to an example embodiment, the multiplexer 12 may be realized as a transmission gate. The multiplexer 12 may include a complementary metal-oxide-semiconductor (CMOS)-based switch including a P-type transistor and an N-type transistor.

Referring to FIGS. 1 and 2, the clock signal CLK may have a clock cycle TP, and oscillate between the first level (logic high) state and the second level (logic low) state. The latch unit 11 may latch the input signal IS based on the clock signal CLK. With reference to FIG. 2, the clock signal CLK is described as a single signal. However, the latch circuit 10 according to an example embodiment is not limited thereto, and according to an example embodiment, the clock signal CLK may include a first clock signal and a second clock signal having the same cycle as each other and having a phase difference of about 180° between each other.

When the clock signal CLK is in the first level state, the multiplexer 12 may output the input signal IS as the output signal OS, and when the clock signal CLK is in the second level state, the multiplexer 12 may output the latch signal LS as the output signal OS. The configuration of the multiplexer 12 may be less complex than the configuration of the latch unit 11, and a delay time of the multiplexer 12 may be shorter than a delay time of the latch unit 11. Thus, in contrast to a comparative example which does not include a multiplexer, because the latch circuit 10 according to an example embodiment may include the latch unit 11 and the multiplexer 12, a delay time of the output signal OS when the output signal OS is generated, which is the NRZ signal, from the input signal IS, which is the RZ signal, may be reduced by a predetermined time D.

Figure 3:
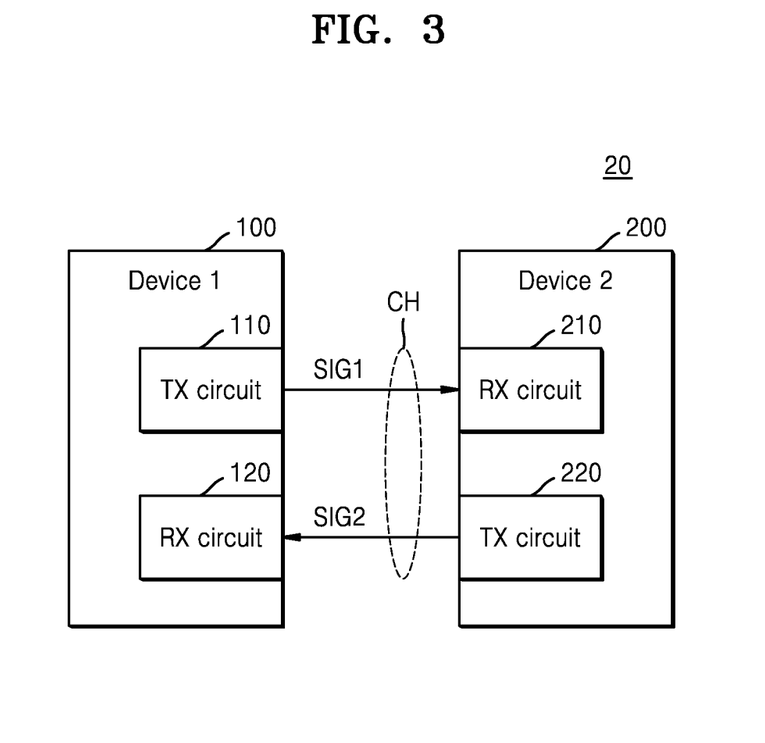
FIG. 3 is a block diagram of an electronic system according to an example embodiment.

FIG. 3 is a block diagram of an electronic system 20 according to an example embodiment.

Referring to FIG. 3, the electronic system 20 may include a first device 100 and a second device 200. According to an example embodiment, each of the first device 100 and the second device 200 may be a portable communication terminal, a personal digital assistant (PDA), a portable media player (PMP), a smartphone, or a computing device, such as a wearable-type device, a personal computer (PC), a server, a workstation, a laptop computer, etc. Alternatively, the first device 100 and the second device 200 may be hardware components commonly provided in one user device, and may be, for example, a processor, a memory device, a storage device, or a controller.

The first device 100 and the second device 200 may exchange signals, that is, first and second signals SIG1 and SIG2, through a channel CH, which is a communication channel. For example, the first device 100 may include a first transmission circuit 110. The first transmission circuit 110 may be configured to transmit, through the channel CH, information generated by the first device 100 to the second device 200, as the first signal SIG1. The second device 200 may include a first reception circuit 210. The first reception circuit 210 may be configured to receive the first signal SIG1 from the first transmission circuit 110 through the channel CH.

Additionally, the second device 200 may include a second transmission circuit 220, and the first device 100 may include a second reception circuit 120. The second transmission circuit 220 may be configured to transmit, through the channel CH, the second signal SIG2 to the first device 100, and the second reception circuit 120 may be configured to receive the second signal SIG2 through the channel CH.

According to an example embodiment, the channel CH may be a signal line (that is, a wired communication channel) or a wireless communication channel connecting the first device 100 and the second device 200. That is, each of the first transmission circuit 110, the second transmission circuit 220, the first reception circuit 210, and the second reception circuit 120 may be configured to transmit and receive various types of signals including an electrical signal, an optical signal, a wireless signal, etc. Hereinafter, for convenience of explanation, it may be assumed that each of the first transmission circuit 110, the second transmission circuit 220, the first reception circuit 210, and the second reception circuit 120 may operate based on the electrical signal.

The first transmission circuit 110 and the second reception circuit 120 are separately illustrated from each other, and the first reception circuit 210 and the second transmission circuit 220 are separately illustrated from each other. However, example embodiments are not limited thereto. For example, the first transmission circuit 110 and the second reception circuit 120 may be realized as one circuit, and the first reception circuit 210 and the second transmission circuit 220 may be realized as one circuit.

According to an example embodiment, the first signal SIG1 may be distorted through the channel CH, due to noise caused by response characteristics of the channel CH or an external factor. In this case, information transmitted by the first transmission circuit 110 and information received by the first reception circuit 210 may be different from each other, and thus, an error or a malfunction may occur in the second device 200.

In order to prevent this error or malfunction, the first transmission circuit 110 or the first reception circuit 210 may include components configured to compensate for signal distortion caused by noise. According to an example embodiment, the first transmission circuit 110 may include a transmission equalizer configured to compensate for signal distortion due to the response characteristics of the channel CH, and the first reception circuit 210 may include a reception equalizer configured to compensate for signal distortion of the first signal SIG1 due to the response characteristics of the channel CH. The first reception circuit 210 may further include a sequence estimator configured to estimate data (or a symbol or a sequence) based on the received first signal SIG1.

The configurations and operations of the first transmission circuit 110 and the first reception circuit 210 described above are described in further detail with reference to the drawings hereinafter. Hereinafter, for convenience of explanation, example embodiments are described based on the first transmission circuit 110 of the first device 100 and the first reception circuit 210 of the second device 200. However, the same descriptions may also be applied to the second transmission circuit 220 and the second reception circuit 120.

Figure 4:
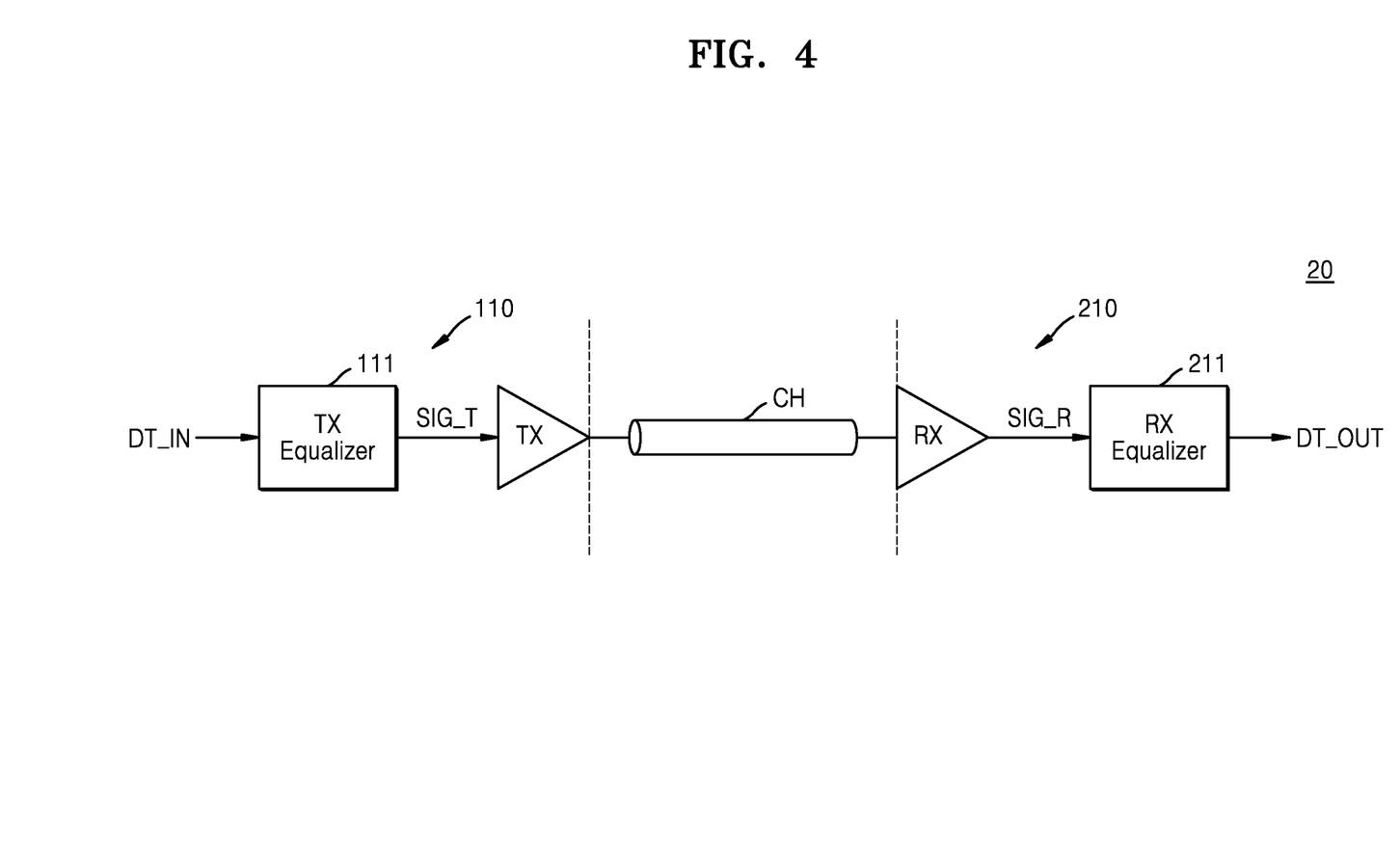
FIG. 4 is a block diagram of a first transmission circuit and a first reception circuit according to an example embodiment.

FIG. 4 is a block diagram of the first transmission circuit 110 and the first reception circuit 210 of FIG. 3. Hereinafter, for convenience of explanation, the terms, such as "signal," "data," "symbol," "bit," etc., are used in order to indicate signals generated/transmitted/received between components. These terms are used to briefly describe example embodiments, and each term shall be understood to be connected with the function of each component.

Referring to FIG. 4, the first transmission circuit 110 may include the transmission equalizer 111 and a transmission driver TX. The transmission equalizer 111 may be configured to receive input data DT_IN and output a transmission data signal SIG_T based on the received input data DT_IN. The transmission driver TX may be configured to transmit the transmission data signal SIG_T to the first reception circuit 210 of the second device 200 through the channel CH. For example, the transmission equalizer 111 may be a feed-forward equalizer (FFE).

The transmission equalizer 111 and the reception equalizer 211 may be decision feedback equalizers (DFE). However, example embodiments are not limited thereto, and the transmission equalizer 111 and the reception equalizer 211 may be realized as various types of signal compensation circuits.

According to an example embodiment, a symbol may indicate data of one or more bits that has a specific logic value, and the inter-symbol interference may occur when interference and distortion occurs between a specific symbol of the input data DT_IN and other symbols of the input data DT_IN. The inter-symbol interference may be intensified as a data transfer rate increases and a pulse width indicating a data bit further decreases according to the increase in the data transfer rate. The transmission equalizer 111 may be configured to generate the transmission data signal SIG_T by reflecting a predetermined coefficient in each of a previous symbol, a current symbol, and a next symbol of the input data DT_IN, in order to remove an inter-symbol interference occurring in the input data DT_IN.

For example, when first through third symbols are sequentially transmitted through the channel CH, due to the response characteristics of the channel CH, a signal corresponding to the first symbol may affect the second symbol and the third symbol, a signal corresponding to the second symbol may affect the first symbol and the third symbol, and a signal corresponding to the third symbol may affect the first symbol and the second symbol. The transmission equalizer 111 may be configured to generate the transmission data signal SIG_T by compensating for components of each of the first through third symbols that affect the other symbols.

The first reception circuit 210 may include a reception driver RX and the reception equalizer 211. The reception driver RX may be configured to receive the transmission data signal SIG_T from the first transmission circuit 110 through the channel CH and output a reception data signal SIG_R. The transmission data signal SIG_T may be distorted through the channel CH due to noise. That is, the reception driver RX may be configured to output the reception data signal SIG_R by receiving the transmission data signal SIG_T distorted due to noise.

The reception equalizer 211 may be configured to output output data DT_OUT based on the reception data signal SIG_R. The reception equalizer 211 may be configured to output the output data DT_OUT by removing an inter-symbol interference. For example, the reception equalizer 121 may be a DFE.

The reception equalizer 211 may be configured to output equalization data (e.g., the output data DT_OUT) by reflecting a predetermined coefficient in each of a previous symbol, a current symbol, and a next symbol, in order to remove the inter-symbol interference from the reception data signal SIG_R. According to an example embodiment, an operation principle of the reception equalizer 211 may be substantially similar to that of the transmission equalizer 111.

According to an example embodiment, the reception equalizer 211 may be an equalizer having a 1-tap structure. That is, the reception equalizer 211 may be configured to offset an inter-symbol interference with respect to a symbol prior to a first cycle. However, example embodiments are not limited thereto, and the reception equalizer 211 may have an n-tap structure (n is a natural number that is greater than or equal to 1).

Figure 5:
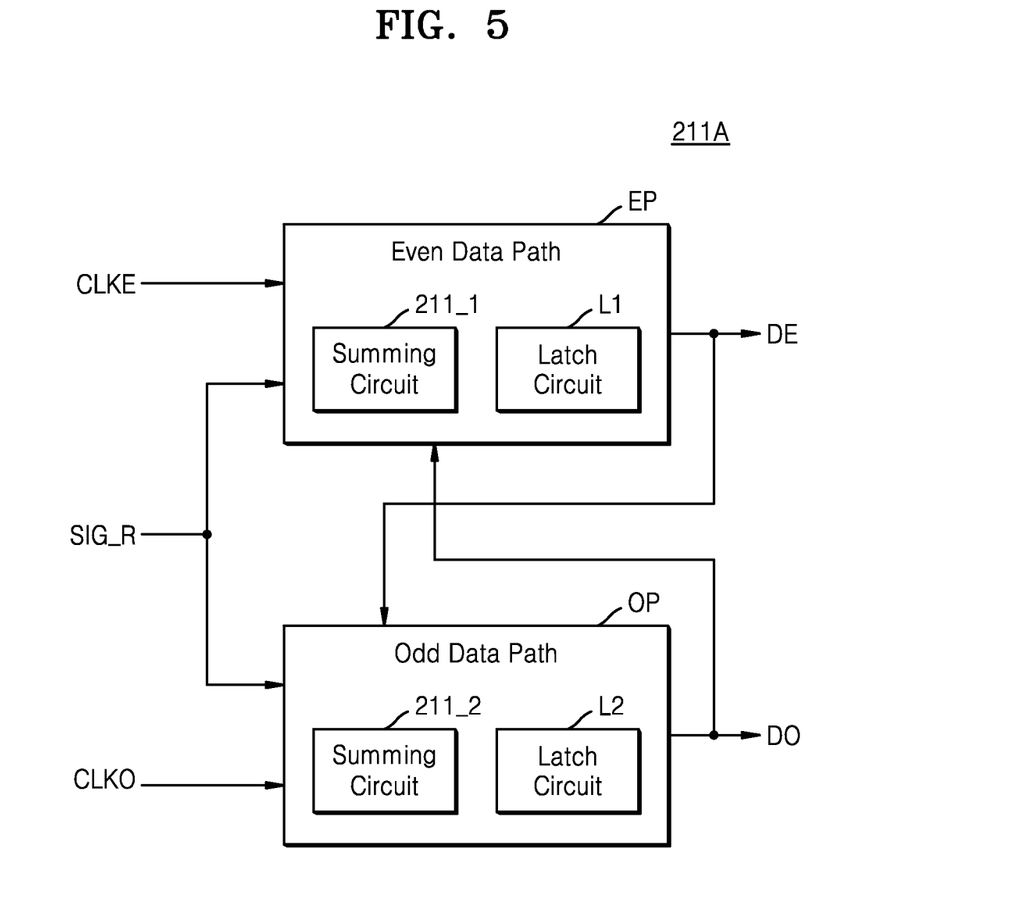
FIG. 5 is a block diagram of an equalizer according to an example embodiment.
Figure 6:
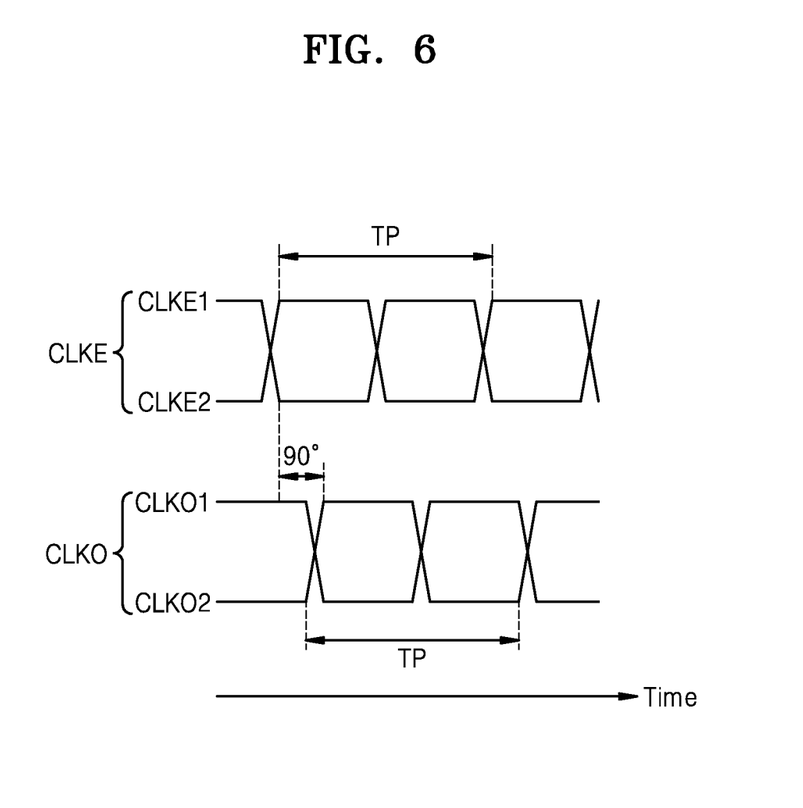
FIG. 6 is a timing diagram of an even clock signal and an odd clock signal according to an example embodiment.

FIG. 5 is a block diagram of an equalizer 211A according to an example embodiment. FIG. 6 is a timing diagram of an even clock signal CLKE and an odd clock signal CLKO according to an example embodiments. For example, the even clock signal CLKE and the odd clock signal CLKO may be provided to the equalizer 211A of FIG. 5. For example, the description given with respect to the equalizer 211A of FIG. 5 may be applied to the reception equalizer 211 of FIG. 4.

Referring to FIG. 5, the equalizer 211A may include an even data path EP and an odd data path OP. The equalizer 211A may be configured to provide an output by dividing the reception data signal SIG_R into parallel data streams, for example, an even data signal DE and an odd data signal DO.

The even data path EP may be configured to receive the reception data signal SIG_R and generate the even data signal DE, and the odd data path OP may be configured to receive the reception data signal SIG_R and generate the odd data signal DO. The odd data signal DO may be input to the even data path EP, and the even data signal DE may be input to the odd data path OP, and thus, the equalizer 211A may include a feedback circuit structure.

The even data path EP may include a first summing circuit 211_1 and a first latch circuit L1, and the odd data path OP may include a second summing circuit 211_2 and a second latch circuit L2. The odd data signal DO may be input to the first summing circuit 211_1 of the even data path EP, and the even data signal DE may be input to the second summing circuit 211_2 of the odd data path OP. Each of the first latch circuit L1 and the second latch circuit L2 may be the latch circuit 10 described with reference to FIG. 1.

The first summing circuit 211_1 may be configured to perform weighted summation on a signal generated by amplifying the reception data signal SIG_R and the odd data signal DO received from the odd data path OP. For example, the first summing circuit 211_1 may be configured to sum up the odd data signal DO with the signal generated by amplifying the reception data signal SIG_R by applying a weight value to the odd data signal DO.

The second summing circuit 211_2 may be configured to perform weighted summation on a signal generated by amplifying the reception data signal SIG_R and the even data signal DE received from the even data path EP. For example, the second summing circuit 211_2 may be configured to sum up the even data signal DE with the signal generated by amplifying the reception data signal SIG_R by applying a weight value to the even data signal DE.

For the equalizer 211A to operate as a DFE, a time (that is, a decision feedback data time) taken for a signal to be transmitted through a data path (for example, SP of FIG. 7) from an output node of the first summing circuit 211_1 of the even data path EP to an output node of the second summing circuit 211_2 of the odd data path OP should be equal to or less than a reference time. For example, the reference time may be 1 UI, which indicates a half-cycle of the even clock signal CLKE or a half cycle of the odd clock signal CLKO. Also, a decision feedback data time from the output node of the second summing circuit 211_2 of the odd data path OP to the output node of the first summing circuit 211_1 of the even data path EP should be equal to or less than 1 UI. The equalizer 211A according to the disclosure may include the first latch circuit L1 and the second latch circuit L2, each of which is realized as the latch circuit 10 described with reference to FIG. 1. Thus, the decision feedback data time may be reduced, and the equalizer 211A may effectually operate as a DFE.

Referring to FIGS. 5 and 6, the even data path EP may be driven by the even clock signal CLKE, and the odd data path OP may be driven by the odd clock signal CLKO. The even clock signal CLKE and the odd clock signal CLKO may have the same cycle TP as each other and oscillate by having the same width as each other.

The even clock signal CLKE and the odd clock signal CLKO may have the same cycle TP as each other and have a phase difference of about 90° between each other. The even clock signal CLKE may include a first even clock signal CLKE1 and a second even clock signal CLKE2 having the same cycle TP as each other. The first even clock signal CLKE1 and the second even clock signal CLKE2 may have a phase difference of about 180° between each other. The odd clock signal CLKO may include a first odd clock signal CLKO1 and a second odd clock signal CLKO2 having the same cycle TP as each other. The first odd clock signal CLKO1 and the second odd clock signal CLKO2 may have a phase difference of about 180° between each other.

The even data path EP may be driven by the first even clock signal CLKE1 and the second even clock signal CLKE2 having complementary phases. Thus, the even data path EP may be configured to generate an even data signal DE including a first even data signal according to the first even clock signal CLKE1 and a second even data signal according to the second even clock signal CLKE2. Also, the odd data path OP may be driven by the first odd clock signal CLKO1 and the second odd clock signal CLKO2 having complementary phases. Thus, the odd data path EP may be configured to generate an odd data signal DO including a first odd data signal according to the first odd clock signal CLKO1 and a second odd data signal according to the second odd clock signal CLKO2.

Figure 7:
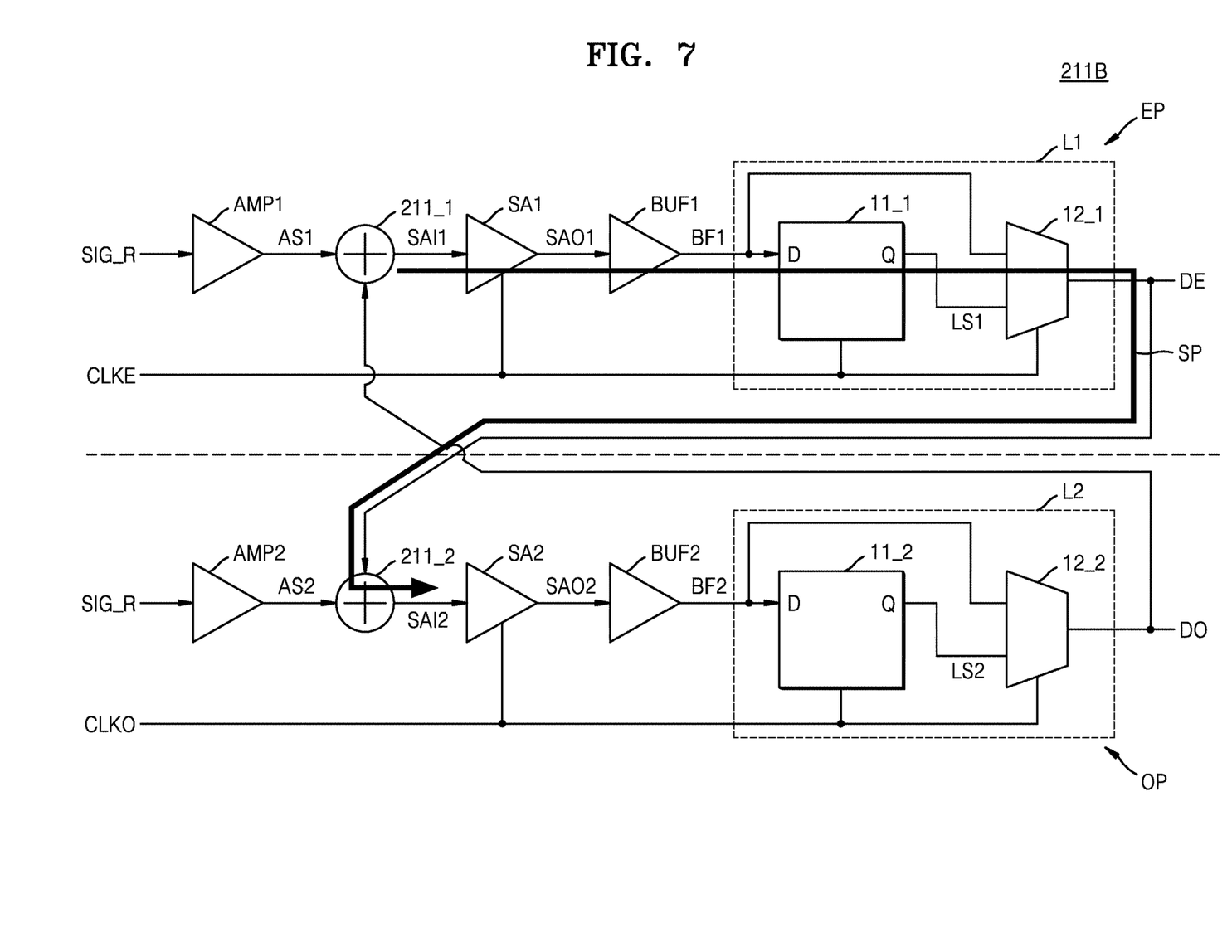
FIG. 7 is a block diagram of an equalizer according to an example embodiment.

FIG. 7 is a block diagram of an equalizer 211B according to an example embodiment. For example, the description given with respect to the equalizer 211B of FIG. 7 may be applied to the first reception equalizer 211 of FIG. 4.

Referring to FIG. 7, the equalizer 211B may include the even data path EP and the odd data path OP. As illustrated, the even data path EP and the odd data path OP may include a first amplifier AMP1 and a second amplifier AMP2, respectively. However, example embodiments are not limited thereto. For example, the even data path EP and the odd data path OP may share an identical amplifier.

The even data path EP may include the first amplifier AMP1, a first summing circuit 211_1, a first sense amplifier SA1, a first buffer BUF1, and the first latch circuit L1. The first amplifier AMP1 may be configured to output a first amplification signal AS1 by receiving a reception data signal SIG_R and amplifying the received reception data signal SIG_R. The first summing circuit 211_1 may be configured to generate a first SA input signal SAI1 by receiving the first amplification signal AS1 and an odd data signal DO, and performing weighted summation on the first amplification signal AS1 and the odd data signal DO.

The first sense amplifier SA1 may be configured to receive the first SA input signal SAI1 and an even clock signal CLKE, and generate a first SA output signal SAO1 by amplifying the first SA input signal SAI1 by using the even clock signal CLKE. The first buffer BUF1 may be configured to generate a first buffer output signal BF1 by receiving the first SA output signal SAO1 and buffering the received first SA output signal SAO1. According to an example embodiment, the even clock signal CLKE may include a first even clock signal and a second even clock signal having complementary phases, as described with reference to FIG. 6.

The first latch circuit L1 may be configured to receive the first buffer output signal BF1 as an input signal and generate an even data signal DE as an output signal. The first buffer output signal BF1 may be an RZ signal, and the even data signal DE may be an NRZ signal.

The first latch circuit L1 may include a first latch unit 11_1 and a first multiplexer 12_1. The first latch unit 11_1 may be configured to latch the first buffer output signal BF1 based on the even clock signal CLKE and generate a first latch signal LS1. The first multiplexer 12_1 may be configured to receive the first buffer output signal BF1 and the first latch signal LS1, and output the first buffer output signal BF1 or the first latch signal LS1 as the even data signal DE according to the even clock signal CLKE. For example, when the even clock signal CLKE is in a first level state, the first multiplexer 12_1 may be configured to output the first buffer output signal BF1 as the even data signal DE, and when the even clock signal CLKE is in a second level state, the first multiplexer 12_1 may be configured to output the first latch signal LS1 as the even data signal DE.

Because the even clock signal CLKE includes the first even clock signal and the second even clock signal having complementary phases, the even data signal DE generated by the first latch circuit L1 may include a first even data signal corresponding to the first even clock signal and a second even data signal corresponding to the second even clock signal. The even data signal DE may be input to the second summing circuit 211_2 of the odd data path OP.

The odd data path OP may include the second amplifier AMP2, the second summing circuit 211_2, a second sense amplifier SA2, a second buffer BUF2, and the second latch circuit L2. The second amplifier AMP2 may be configured to output a second amplification signal AS2 by receiving a reception data signal SIG_R and amplifying the received reception data signal SIG_R. The second summing circuit 211_2 may be configured to generate a second SA input signal SAI2 by receiving the second amplification signal AS2 and an even data signal DE, and performing weighted summation on the second amplification signal AS2 and the even data signal DE.

The second sense amplifier SA2 may be configured to receive the second SA input signal SAI2 and an odd clock signal CLKO, and generate a second SA output signal SAO2 by amplifying the second SA input signal SAI2 by using the odd clock signal CLKO. The second buffer BUF2 may be configured to generate a second buffer output signal BF2 by receiving the second SA output signal SAO2 and buffering the received second SA output signal SAO2. According to an example embodiment, the odd clock signal CLKO may include a first odd clock signal and a second odd clock signal having complementary phases as described with reference to FIG. 6.

The second latch circuit L2 may be configured to receive the second buffer output signal BF2 as an input signal and generate an odd data signal DO as an output signal. The second buffer output signal BF2 may be an RZ signal, and the odd data signal DO may be an NRZ signal.

The second latch circuit L2 may include a second latch unit 11_2 and a second multiplexer 12_2. The second latch unit 11_2 may be configured to latch the second buffer output signal BF2 based on the odd clock signal CLKO and generate a second latch signal LS2. The second multiplexer 12_2 may be configured to receive the second buffer output signal BF2 and the second latch signal LS2 and output the second buffer output signal BF2 or the second latch signal LS2 as the odd data signal DO according to the odd clock signal CLKO. For example, when the odd clock signal CLKO is in a first level state, the second multiplexer 12_2 may be configured to output the second buffer output signal BF2 as the odd data signal DO, and when the odd clock signal CLKO is in a second level state, the first multiplexer 12_1 may be configured to output the second latch signal LS2 as the odd data signal DO.

Because the odd clock signal CLKO includes the first odd clock signal and the second odd clock signal having complementary phases, the odd data signal DO generated by the second latch circuit L2 may include a first odd data signal corresponding to the first odd clock signal and a second odd data signal corresponding to the second odd clock signal. The odd data signal DO may be input to the first summing circuit 211_1 of the even data path EP.

According to an example embodiment, the first multiplexer 12_1 of the first latch circuit L1 and the second multiplexer 12_2 of the second latch circuit L2 may be realized as transmission gates. The first and second multiplexers 12_1 and 12_2 may each be a CMOS-based switch including a P-type transistor and an N-type transistor. The first latch circuit L1 and the second latch circuit L2 may be configured to respectively output the even data signal DE and the odd data signal DO having reduced delay times.

Figure 8:
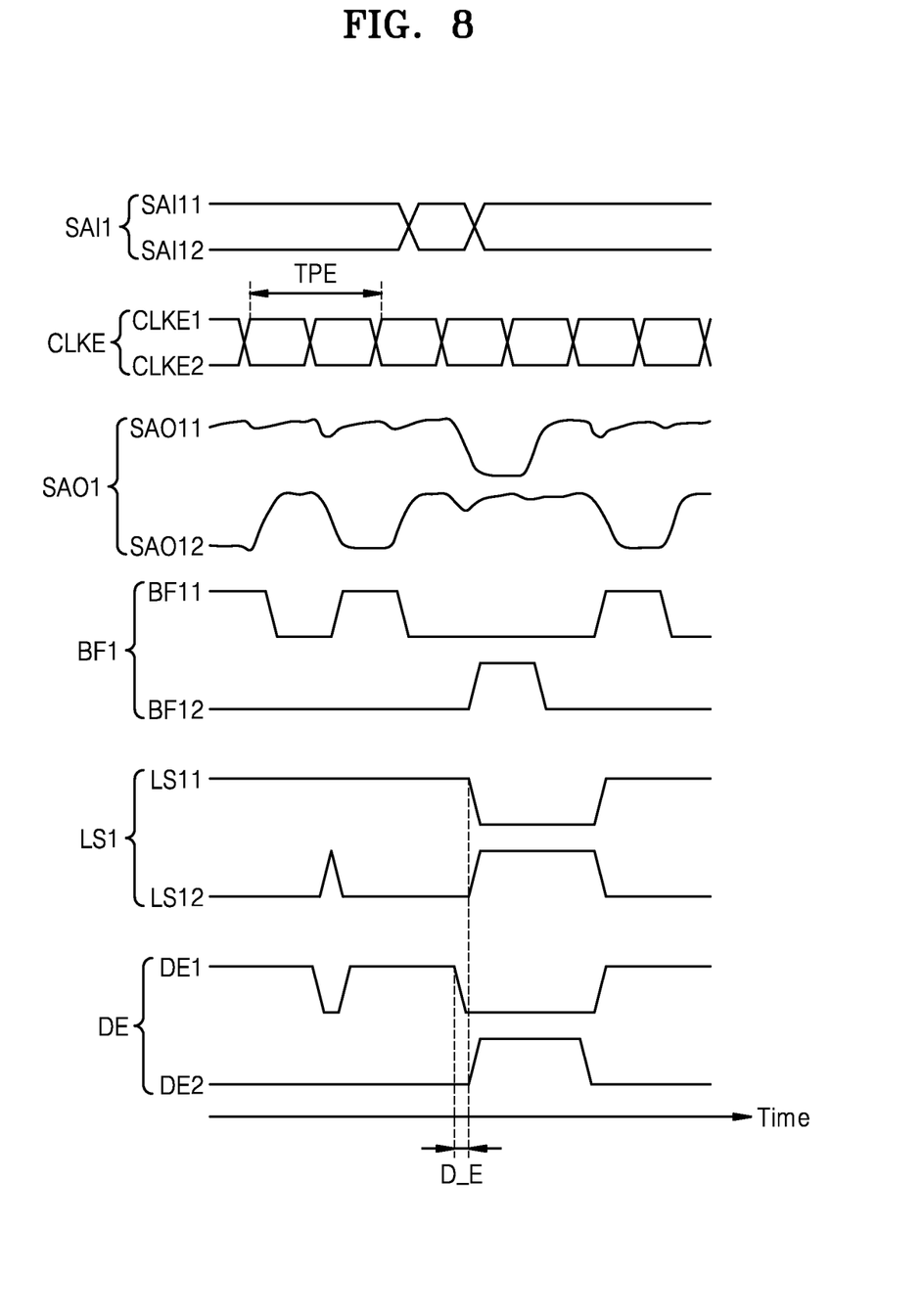
FIG. 8 is a timing diagram of signals of an even data path according to an example embodiment.

FIG. 8 is a timing diagram of signals of an even path according to an example embodiment. For example the timing diagram of signals illustrated in FIG. 8 may correspond to the even data path EP of FIG. 7. FIG. 8 schematically (as a type including noise) illustrates each of the signals of the even data path EP and shows a change of each signal according to an even clock signal CLKE after a first SA input signal SAI1 of a specific waveform is input to the first sense amplifier SA1. The description about the signals with reference to FIG. 8 may be similarly applied to signals of the odd data path OP of FIG. 7.

Referring to FIGS. 7 and 8, the first SA input signal SAI1 may include signals SAI11 and SAI12, which are complementary to each other. The even data path EP may be configured to operate based on the even clock signal CLKE, and the even clock signal CLKE may include a first even clock signal CLKE1 and a second even clock signal CLKE2 having the same cycle TP as each other and a phase difference of about 180° between each other. Thus, a first SA output signal SAO1 may include complementary signals SAO11 and SAO12, a first buffer output signal BF1 may include complementary signals BF11 and BF12, a first latch signal LS1 may include complementary signals LS11 and LS12, and an even data signal DE may include complementary signals DE1 and DE2.

The first SA output signal SAO1 may be a signal generated as a result of sensing the first SA input signal SAI1 via the first sense amplifier SA1 and may be a relatively sensitive signal. The first buffer BUF1 may be configured to generate the first buffer output signal BF1 by buffering the first SA output signal SAO1, and because the first buffer output signal BF1 may be an RZ signal, the first buffer output signal BF1 may be difficult to be input to the second summing circuit 211_2.

The first latch unit 11_1 and the first multiplexer 12_1 may operate according to the even clock signal CLKE, and thus, when the first latch unit 11_1 takes a data value of the first buffer signal BF1, the first multiplexer 12_1 may also transmit the first buffer signal BF1 to the second summing circuit 211_2 as the even data signal DE at the same timing. Also, the first multiplexer 12_1 may be configured to, at a timing at which the first latch unit 11_1 maintains data, transmit the first latch signal LS1 output by the first latch unit 11_1 to the second summing circuit 211_2 as the even data signal DE. Thus, the even data signal DE output by the first multiplexer 12_1 may be an NRZ signal.

The configuration of the first multiplexer 12_1 may be less complex than the configuration of the first latch unit 11_1, and a delay time of the first multiplexer 12_1 may be shorter than a delay time of the first latch unit 11_1. Thus, a delay time occurring in an output signal OS may be reduced by about a delay time occurring in the first latch unit 11_1 and by a predetermined time D_E.

For the equalizer 211B to operate as a DFE, a decision feedback data time, which is a time taken for a signal to be transmitted through a data path SP from an output node of the first summing circuit 211_1 of the even data path EP to an output node of the second summing circuit 211_2 of the odd data path OP, should be equal to or less than 1 UI. Also, a decision feedback data time from the second summing circuit 211_2 of the odd data path OP to the first summing circuit 211_1 of the even data path EP should be equal to or less than 1 UI. Thus, the equalizer 211B may effectually operate as the DFE.

Figure 9:
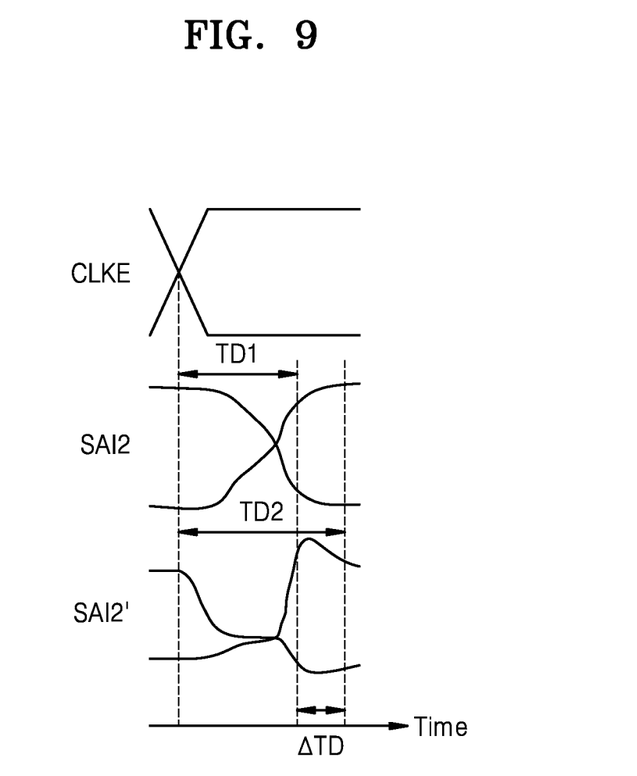
FIG. 9 is a timing diagram for comparing a delay time of a second SA input signal of an odd data path transmitted through a data path between an example embodiment and a comparative example.

FIG. 9 is a timing diagram for comparing a delay time of a second SA input signal of an odd data path transmitted through a data path SP between an example embodiment and a comparative example.

Referring to FIGS. 7 and 9, based on an even clock signal CLKE input to the first sense amplifier SA1 of the equalizer 211B according to the disclosure, a second SA input signal SAI2 generated from the data path SP may be delayed by a first delay time TD1. A time from a rising edge or a falling edge of the first even clock signal CLKE to a time point at which a high level or a low level of the second SA input signal SAI2 is stabilized may be the first delay time TD1.

However, a second SA input signal SAI2' generated from a data path according to a comparative example, the data path that includes a latch circuit not including a multiplexer and including only a latch unit may be delayed by a second delay time TD2. A time from a rising edge or a falling edge of the first even clock signal CLKE to a time point at which a high level or a low level of the second SA input signal SAI2' is stabilized may be calculated as the second delay time TD2.

The equalizer 211B according to the disclosure may include the first latch circuit L1 including the first latch unit 11_1 and the first multiplexer 12_1, and thus, the first delay time TD1 of the second SA input signal SAI2 may be reduced by LTD compared to the second delay time TD2 of the second SA input signal SAI2'. Thus, the first delay time TD1 of the second SA input signal SAI2, that is, the decision feedback data time, may be equal to or less than 1 UI.

Figure 10:
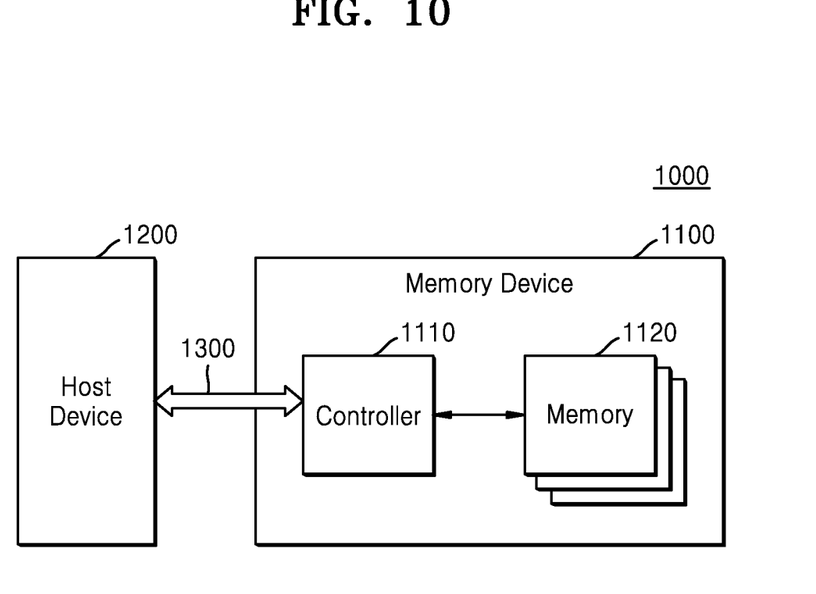
FIG. 10 is a diagram of a system including an equalizer according to an example embodiment.

FIG. 10 is a diagram of a system including an equalizer according to an example embodiment.

Referring to FIG. 10, a memory device 1100 and a host device 1200 may communicate with each other through an interface 1300, and the memory device 1100 may include a controller 1110 and a memory 1120.

The interface 1300 may use an electrical signal and/or an optical signal and, for example, may include, but is not limited to, a serial advanced technology attachment (SATA) interface, a SATA express (SATAe) interface, a serial attached small computer system (SAS) interface, serial attached small computer system interface (SCSI), a universal serial bus (USB) interface, or a combination thereof. The interface 1300 may include any one or any combination of the latch circuit 10 of FIG. 1, the equalizer 211A of FIG. 5, and the equalizer 211B of FIG. 7. Accordingly, the interface 1300 may obtain a sufficient bandwidth and may reduce an operation time.

According to an example embodiment, the memory device 1100 may be removably coupled to the host device 1200 and may communicate with the host device 1200. The memory 1120 may be a nonvolatile memory, and the memory device 1100 may also be referred to as a storage system. For example, the memory device 1100 may be realized as a solid-state drive or solid-state disk (SSD), an embedded SSD (eSSD), a multimedia card (MMC), an embedded MMC (eMMC), etc., but is not limited thereto. The controller 1110 may be configured to control the memory 1120 in response to a request received from the host device 1200 through the interface 1300.

Figure 11:
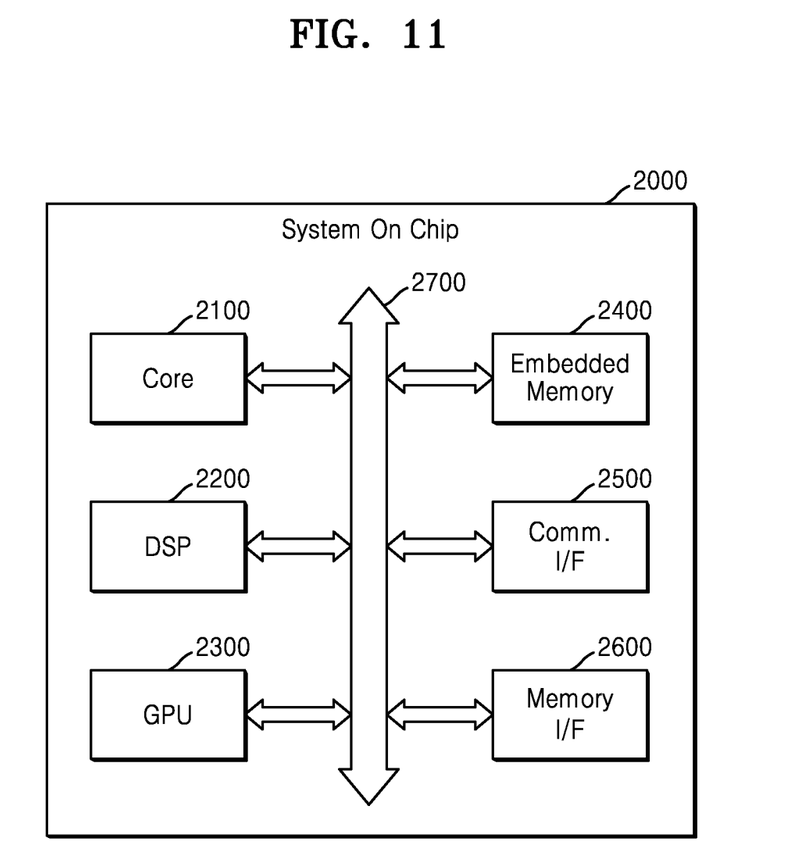
FIG. 11 is a diagram of a system-on-chip (SoC) including an equalizer according to an example embodiment.

FIG. 11 is a diagram of a system-on-chip (SoC) 2000 including an equalizer according to an example embodiment.

Referring to FIG. 11, the SoC 2000 may refer to an integrated circuit in which components of a computing system or other electronic systems are integrated. For example, an application processor (AP), one example of the SoC 2000, may include a processor and components for other functions. As illustrated in FIG. 11, the SoC 2000 may include a core 2100, a digital signal processor (DSP) 2200, a graphics processing unit (GPU) 2300, an embedded memory 2400, a communication interface 2500, and a memory interface 2600. The components of the SoC 2000 may communicate with one another through a bus 2700.

The core 2100 may be configured to process instructions and control operations of the components included in the SoC 2000. For example, the core 2100 may be configured to drive an operating system (OS) and execute applications on the OS by processing a series of instructions. The DSP 2200 may be configured to generate useful data by processing a digital signal, for example, a digital signal provided from the communication interface 2500. The GPU 2300 may be configured to generate data for an image that is output through a display, based on image data provided from the embedded memory 2400 or the memory interface 2600, or may encode the image data. The embedded memory 2400 may store data necessary for the core 2100, the DSP 2200, and the GPU 2300 to operate. The memory interface 2600 may be configured to provide an interface with respect to an external memory of the SoC 2000, for example, dynamic random access memory (DRAM), flash memory, etc.

The communication interface 2500 may be configured to provide serial communication with the outside of the SoC 2000. For example, the communication interface 2500 may access Ethernet. The communication interface 2500 may include any one or any combination of the latch circuit 10 of FIG. 1, the equalizer 211A of FIG. 5, and the equalizer 211B of FIG. 7. Thus, the communication interface 2500 may obtain a sufficient bandwidth and may reduce an operation time.

At least one of the components, elements, modules and units represented by a block as illustrated in FIGS. 1, 3-5, 7, 10 and 11 may be embodied as various numbers of hardware, software and/or firmware structures that execute respective functions described above, according to example embodiments. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, communication between the components, elements, modules or units may be performed through a bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. An equalizer comprising:
an even data path configured to receive a reception data signal, and comprising a first summing circuit and a first latch circuit; and
an odd data path configured to receive the reception data signal, and comprising a second summing circuit and a second latch circuit,
wherein an even data signal output from the first latch circuit is configured to be input to the second summing circuit, and an odd data signal output from the second latch circuit is configured to be input to the first summing circuit,
each of the first latch circuit and the second latch circuit comprises a latch and a multiplexer, and
the multiplexer of the first latch circuit is configured to receive a signal that is input to the latch of the first latch circuit as a first input, receive a signal that is output from the latch as a second input, output the signal received as the first input based on data being applied to the latch, and output the signal received as the second input based on the data being maintained in the latch.

2. The equalizer of claim 1, wherein the latch and the multiplexer of the first latch circuit are configured to operate based on an even clock signal,
the latch and the multiplexer of the second latch circuit are configured to operate based on an odd clock signal, and
the even clock signal and the odd clock signal have a same cycle and a phase difference of about 90°.

3. The equalizer of claim 2, wherein the even clock signal comprises a first even clock signal and a second even clock signal having a same cycle and a phase difference of about 180°, and
the odd clock signal comprises a first odd clock signal and a second odd clock signal having a same cycle and a phase difference of about 180°.

4. The equalizer of claim 2, wherein the odd data path is further configured to provide a signal from an output node of the first summing circuit to an output node of the second summing circuit in less than or equal to a half of the cycle of the even clock signal.

5. The equalizer of claim 1, wherein the even data signal and the odd data signal are non-return to zero (NRZ) signals.

6. An equalizer comprising:
an even data path configured to receive a reception data signal, and comprising a first summing circuit and a first latch circuit; and
an odd data path configured to receive the reception data signal, and comprising a second summing circuit and a second latch circuit,
wherein an even data signal output from the first latch circuit is configured to be input to the second summing circuit, and an odd data signal output from the second latch circuit is configured to be input to the first summing circuit,
each of the first latch circuit and the second latch circuit comprises a latch and a multiplexer, and
the even data path further comprises:
- a first sense amplifier configured to receive a first source amplifier input signal that is output from the first summing circuit and generate a first source amplifier output signal; and
- a first buffer configured to generate a first buffer output signal based on the first source amplifier output signal and provide the first buffer output signal to the first latch circuit.

7. The equalizer of claim 6, wherein the odd data path further comprises:
- a second sense amplifier configured to receive a second source amplifier input signal that is output from the second summing circuit and generate a second source amplifier output signal; and
- a second buffer configured to generate a second buffer output signal based on the second source amplifier output signal and provide the second buffer output signal to the second latch circuit.

8. An equalizer comprising an even data path configured to receive a reception data signal and generate an even data signal based on an even clock signal, wherein the even data path comprises:
- a first amplifier configured to amplify the reception data signal and output a first amplification signal;
- a first summing circuit configured to sum the first amplification signal and an odd data signal, and generate a first source amplifier input signal;
- a first sense amplifier configured to generate a first source amplifier output signal based on the first source amplifier input signal;
- a first buffer configured to generate a first buffer output signal based on the first source amplifier output signal; and
- a first latch circuit including a latch and a multiplexer, and configured to generate the even data signal based on the first buffer output signal,
wherein the multiplexer of the first latch circuit is configured to receive the first buffer output signal and a latch signal, and output one of the first buffer output signal and the latch signal as the even data signal according to the even clock signal.

9. The equalizer of claim 8, wherein the equalizer is a decision feedback equalizer (DFE).

10. The equalizer of claim 8, wherein the latch of the first latch circuit is configured to latch the first source amplifier input signal based on the even clock signal and generate the latch signal.

11. The equalizer of claim 10, wherein the multiplexer of the first latch circuit is further configured to output the first buffer output signal as the even data signal based on data being applied to the latch of the first latch circuit, and output the latch signal as the even data signal based on the data being maintained in the latch.

12. The equalizer of claim 8, wherein the first summing circuit is further configured to perform weighted summation of the first amplification signal and the odd data signal.

13. The equalizer of claim 8, further comprising an odd data path configured to receive the reception data signal and generate the odd data signal based on an odd clock signal,
wherein the odd data path further comprises:
- a second amplifier configured to amplify the reception data signal and output a second amplification signal;
- a second summing circuit configured to sum the second amplification signal and the even data signal, and generate a second source amplifier input signal;
- a second sense amplifier configured to generate a second source amplifier output signal based on the second source amplifier input signal;
- a second buffer configured to generate a second buffer output signal based on the second source amplifier output signal; and
- a second latch circuit including a latch and a multiplexer, and configured to generate the odd data signal based on the second buffer output signal.

14. The equalizer of claim 13, wherein the even clock signal and the odd clock signal have a same cycle and a phase difference of about 90°.

15. The equalizer of claim 8, wherein the multiplexer of the first latch circuit is a transmission gate.

* * * * *